United States Patent
Sukkarieh

(10) Patent No.: US 11,573,968 B2
(45) Date of Patent: Feb. 7, 2023

(54) SYSTEMS AND METHODS OF CREATING AND USING A TRANSPARENT, COMPUTABLE CONTRACTUAL NATURAL LANGUAGE

(71) Applicant: Jana Sukkarieh, Princeton, NJ (US)

(72) Inventor: Jana Sukkarieh, Princeton, NJ (US)

(*) Notice: Subject to any disclaimer, the term of this patent is extended or adjusted under 35 U.S.C. 154(b) by 0 days.

(21) Appl. No.: 17/703,213

(22) Filed: Mar. 24, 2022

(65) Prior Publication Data

US 2022/0318245 A1 Oct. 6, 2022

Related U.S. Application Data

(60) Provisional application No. 63/165,317, filed on Mar. 24, 2021, provisional application No. 63/323,129, filed on Mar. 24, 2022.

(51) Int. Cl.
| | |
|---|---|
| *G06F 40/289* | (2020.01) |
| *G06F 40/211* | (2020.01) |
| *G06F 40/169* | (2020.01) |
| *G06F 40/117* | (2020.01) |
| *G06F 40/30* | (2020.01) |
| *G06F 16/2458* | (2019.01) |
| *G06Q 50/18* | (2012.01) |
| *G06N 20/00* | (2019.01) |

(52) U.S. Cl.
CPC ........ *G06F 16/2465* (2019.01); *G06F 40/117* (2020.01); *G06F 40/169* (2020.01); *G06F 40/211* (2020.01); *G06F 40/289* (2020.01); *G06F 40/30* (2020.01); *G06N 20/00* (2019.01); *G06Q 50/18* (2013.01)

(58) Field of Classification Search
CPC .. G06F 16/2465; G06F 40/117; G06F 40/169; G06F 40/211; G06F 40/289; G06F 40/30; G06N 20/00; G06Q 50/18
USPC .......................................................... 704/9
See application file for complete search history.

(56) References Cited

U.S. PATENT DOCUMENTS

| | | | |
|---|---|---|---|
| 9,218,339 B2 | 12/2015 | Zechner et al. | |
| 9,471,667 B2 | 10/2016 | Yamamoto et al. | |
| 2021/0182990 A1* | 6/2021 | Vidhani | G06Q 40/04 |

OTHER PUBLICATIONS

McAllester et al (1992). Natural language syntax and first-order inference, Artificial Intelligence 56: 1-20.

* cited by examiner

*Primary Examiner* — Thierry L Pham
(74) *Attorney, Agent, or Firm* — RosserIP, LLC; Roy Rosser

(57) ABSTRACT

System and methods of creating and using a transparent, computable contractual natural language are disclosed in which a set of legal contracts are text mined to obtain a structured contractual database. A set of categorized contractual phrases are assembled from the structured contractual database. A transparent knowledge representation language is defined having a set of syntax rules, a set of semantic rules and a set of inference rules. A transparent, computable contractual natural language is the set of contractual phrases that map to the transparent knowledge representation language. A user writes computable legal documents comprised of phrases contained in the transparent, computable contractual natural language.

12 Claims, 12 Drawing Sheets

| Class Expressions | Example |
|---|---|
| A constant symbol c | John-Smith |
| A monadic predicate symbol | Tenant |
| (R(some s)) | (enforce (some charge)) |
| (R(every s)) | (impound (every vehicle)) |
| A variable symbol | $x$ |
| $\lambda x.\Phi(x)$ | $\lambda x.$ <br> $(at-most-one\ x$ <br> $(represent\ (some\ organization)))$ |
| (R3 (Q1 s) (Q2 t)) | (allocate (every tenant) (at-least-one space)) <br> as in "Landlord allocates every tenant at least one space" OR <br> (award (the participant) (9000 shares)) <br> as in example "The company awards the participant 9000 shares" |
| $(R^{-1}(Q1s))$ | $(pay^{-1}(every\ landlord))$ <br> as in "Taxes are paid by every landlord" |
| $(R_3^{-1}(Q1s)(Q2t))$ | $(award^{-1}(the\ company)\ (9000\ shares))$ <br> as in "The participant is awarded 9000 shares by the company" |
| Q2 * s | $more-than-one*man$ |
| ti or Time Expression | t1, t2, etc |

| Well-Formed Formula | Example |
|---|---|
| (every s w) | (every tenant (pay (some utility))) |
| (some s w) | (some tenant (pay (some deposit))) |
| (at-most-one s) | (at-most-one manager) |
| (some s exists) | (some team exists) |
| Negation of a formula | not(every team (sign-off (some trigger))) |
| Boolean combinations | (some team exists) and |
| of formulae | not(every team(sign-off (some trigger))) |
| (N * s t) | $(more-than-one*general-manager\ competent)$ |

TABLE 1: SYNTAX OF A TRANSPARENT KNOWLEDGE REPRESENTATION LANGUAGE

FIG. 9

- $V(c, M, \rho) = \{I(c)\}$, for any constant $c$. The semantic value of a constant class expression is a singleton subset of $D$.

- $V(x, M, \rho) = \{\rho(x)\}$, for any variable $x$. Hence, the semantic value of a variable is a singleton subset of $D$.

- $V(s, M, \rho) = I(s)$, where $s$ is a class symbol that is not a variable. The semantic value of a class expression is a subset of $D$.

- $V((R(every\ s)), M, \rho) = \{d \in D \mid \forall d'.d' \in V(s, M, \rho) \rightarrow d \in I(R)(d')\}$. (consider $(climb(every\ tree))$)

- $V((R(some\ s)), M, \rho) = \{d \mid \exists d'.d' \in V(s, M, \rho) \wedge d \in I(R)(d')\}$. (consider $(climb(some\ tree))$)

- $V((every\ s\ t), M, \rho)$ is true iff $V(s, M, \rho) \subseteq V(t, M, \rho)$. $(every\ s\ t)$ is true iff the denotation of $s$ is a subset of the denotation of $t$.

- $V((some\ s\ t), M, \rho)$ is true iff $V(s, M, \rho) \cap V(t, M, \rho) \neq \emptyset$. $(some\ s\ t)$ is true iff the denotation of $s$ and the denotation of $t$ have at least one element in common.

- $V(\lambda x.\phi(x), M, \rho) = \{d \mid V(\phi(x), M, \rho[x := d])\ \text{is true}\}$ where $\rho[x := d]$ is the same as $\rho$ except that it interprets $x$ as $d$. The semantic value of a lambda expression $\lambda x.\phi(x)$ is the set of elements that make the formula, $\phi$, true.

TABLE 2: SEMANTIC EVALUATION FUNCTIONS OF A TRANSPARENT KNOWLEDGE REPRESENTATION LANGUAGE

FIG. 10

Rule & Type of Mother category

Sentences

$S \rightarrow NP\ VP : NP'(VP') : t$ $S_{prog} \rightarrow V_{aux}\ S_{inf} : t$ $S_{sub} \rightarrow NP_{subj}\ VP : (e - expr \rightarrow t) \rightarrow t$ $S_{sub} \rightarrow NP_{subj}\ S_{prog} : (e - expr \rightarrow t) \rightarrow t$

Noun Phrases

$NP \rightarrow DET\ NOM : DET'(N') : \lambda X.(DET'\ N'\ X) : e - exp \rightarrow t$

Verb Phrases

$VP \rightarrow V_{intransitive} : V' : e - exp$ $VP \rightarrow V_{transitive}\ NP : V'(NP') : e - exp$ $VP \rightarrow V_{ditrans}\ NP\ NP : V'((NP', NP')) : e - exp$ $VP \rightarrow V_{ditransitive}\ NP\ PP_{to} : V'((NP', PP')) : e - exp$ $VP \rightarrow V_{predicative}\ AdjP : AdjP' : e - exp$ $VP \rightarrow V_{predicative}\ PP_{pl} : PP' : e - exp$ $VP \rightarrow V_{predicative}\ NP|Nom] : Nom' : e - exp$ $VP \rightarrow VP\ Mod : VP' \# Mod' : e - exp$

Nominals

$Nom \rightarrow Adjp_{conjunctive}\ Nom : Adjp' + Nom' : e - exp + e - exp = e - exp$ $Nom \rightarrow Nom\ Mod : Nom' + Mod' : e - exp + e - exp = e - exp$ $Nom \rightarrow Nom\ conj\ Nom : Nom' \odot Nom' : e - exp \odot e - exp = e - exp$ $Nom \rightarrow Nom\ Var : e - exp$

Prepositional Phrases

$PP \rightarrow P\ NP : PP'_{pl} = NP' : e - exp \rightarrow t$ $PP \rightarrow P\ NP : PP'_{pl} = P'(NP') : e - exp$

Relative clauses

$S_{subjrelclause} \rightarrow NP_{rel}\ VP : VP' : e - exp$ $S_{nonsubjrelclause} \rightarrow NP_{rel}\ (S/NP) : (S/NP)' : e - exp$

Comparatives

$NP_{comparative} \rightarrow NP_{comparative}\ S_{comparative}/NP$ $Nom \rightarrow Adjp_{comparative} + Nom_{singular} :$
$Nom' + (Adjp'(some/every\ Nom')) : e - expr + e - expr$

Verbs

$V_{predicative} \rightarrow is : Identity\ function : type_i \rightarrow type_i$ $V_{transitive} \rightarrow V : \lambda P.(V\ P) : (e - exp \rightarrow t) \rightarrow e - expr$ $V_{ditransitive} \rightarrow V : \lambda(P,Q).(V(P,Q)) :$
$(e - exp \rightarrow t, e - exp \rightarrow t) \rightarrow e - exp$ TABLE 3: SUMMARY OF MAPPING CATEGORIZED CONTRACTUAL PHRASES TO A TRANSPARENT KNOWLEDGE REPRESENTATION LANGUAGE

FIG. 11

Boolean Rules

(b1) $\frac{\phi, not(\phi)}{false}$   (b2) $\frac{\phi}{(not(not\phi))}$ (b3) $\frac{(not(not\phi))}{\phi}$   (b4) $\frac{\phi}{\phi\vee\phi}$ (b5) $\frac{\phi}{\phi\vee\phi}$   (b6) $\frac{\phi\vee\phi, (not\phi)}{\phi}$

Obvious Rules

(7) $(every\ C\ C)$   (19) $(every\ C\ C\$W)$

(20) $(every\ W\ C\$W)$   (21) $(every\ C + W\ C)$

(22) $(every\ C + W\ W)$   (38) $(every\ C \# W\ C)$

Constant and Variable Rules

(8) $(some\ C\ exists)$   (9) $(at\_most\_one\ C)$

Common-Sense Rules

(10) $\frac{(some\ C\ exists)}{(some\ C\ C)}$   (11) $\frac{(some\ C\ W)}{(some\ C\ exists)}$

(12) $\frac{(some\ C\ W)}{(some\ W\ C)}$   (13) $\frac{(every\ P\ Q), (every\ Q\ Z)}{(every\ P\ Z)}$

(14) $\frac{(every\ C\ Z), (some\ C\ W)}{(some\ Z\ W)}$   (15) $\frac{(some\ C\ W), (at\_most\_one\ C)}{(every\ C\ W)}$

(16) $\frac{(every\ S\ T), (at\_most\_one\ T)}{(at\_most\_one\ S)}$   (17) $\frac{(not(at\_most\_one\ C))}{(some\ C\ exists)}$

(18) $\frac{(some\ S\ exists)}{(not(every\ S\ T))}$   (23) $\frac{(every\ C\ Z), (every\ W\ Z)}{(every\ C\$W\ Z)}$

(24) $\frac{(every\ Z\ C), (every\ Z\ W)}{(every\ Z\ C+W)}$   (25) $\frac{(some\ C\ Z)}{(some\ C+Z\ exists)}$

(26) $\frac{(not(some\ S\ exists))}{(every\ T)(every\ S)}$   (27) $\frac{(every\ C\ W\$Z), (not(some\ C\ W))}{(every\ C\ Z)}$

(28) $\frac{(every\ C\ W\$Z), (not(some\ C\ Z))}{(every\ C\ W)}$   (29) $\frac{(every\ P\ Q)}{(every\ (R(some\ P))\ (R(some\ Q)))}$

(30) $\frac{(every\ P\ Q)}{(every\ (R(every\ Q))\ (R(every\ P)))}$   (31) $\frac{(some\ C\ W)}{(every\ (R(every\ C))\ (R(some\ W)))}$

(32) $\frac{(some\ (R(some\ S))\ exists)}{(some\ S\ exists)}$   (33) $\frac{\phi[y], (seus-on\ y)}{(y\lambda x\phi(x))}$

(34) $\frac{(y\lambda x\phi(x))\ (sens-on\ y)}{\phi(y)}$   (35) $\frac{(more\_than\_one*s+t)}{(more\_than\_one*s+t\ exists)}$

(36) $\frac{(more\_than\_one*s+t\ exists)}{(more\_than\_one*s)}$   (37) $\frac{(N_1t), (every\ s\ q)}{(N_1q)}$

(39) $\frac{(N_1t)}{(N_1t)}$   (40) $\frac{(N_3p), (every\ s\ z)}{(N_3p+z)}$

(41) $\frac{(D\ A\ B), (every\ B\ C)}{(D\ A\ C)}$   (42) $\frac{(at\_most\_Nt\ t)}{(at\_most\_Nt\ t+k)}$

(43) $\frac{(at\_most\_Nt)}{(at\_most\_Ns+k\ t)}$   (44) $\frac{(at\_most\_Ns\ (R(some\ t)))}{(at\_most\_Ns\ (R(some\ k+t)))}$

(45) $\frac{(at\_most\_Nt)}{(at\_most\_Ns+k\ t)}$   (46) $\frac{(more\_than\_one*s\ t)}{(some\ s\ t)}$

(47) $\frac{(N_1s\ a)}{(N_4s+k\ a)}$

TABLE 4:   SUMMARY OF INFERENCE RULES FOR TRANSPARENT KNOWLEDGE REPRESENTATION LANGUAGE

FIG. 12

SYSTEMS AND METHODS OF CREATING AND USING A TRANSPARENT, COMPUTABLE CONTRACTUAL NATURAL LANGUAGE

CROSS-REFERENCE TO RELATED APPLICATIONS

This is a US non-provisional application of U.S. provisional application 63/165,317 entitled "Transparent Legal Language Representation and Mining" filed on Mar. 24, 2021, and is also a non-provisional application of U.S. provisional application 63/323,129 entitled "Builder for Smarter Contracts: Transparent Legal Language Representation and Reasoning" filed on Mar. 24, 2022, the contents of all of which are hereby fully incorporated by reference.

BACKGROUND OF THE INVENTION

(1) Field of the Invention

The invention relates to systems and methods of creating and using transparent, computable contractual natural languages, and more particularly to using text mining to obtain a structured contractual database that may then be assembled into computable contractual natural language through mapping to a transparent knowledge representation language. The resultant transparent, computable contractual natural language may be used for producing human readable computable documents, particularly human readable computable legal contracts, and human readable computable contract templates.

(2) Description of Related Art

Traditional legal contracts tend to be agreements represented in lengthy ambiguous legalese-loaded documents that are sometimes only intelligible to seasoned legal professionals. They are often the result of customization of historical templates or previous contracts have been edited, appended, and cut/pasted over years as an original contract gets applied to transaction after transaction over periods of time. This almost invariably results in terms and conditions that are either disparate, contradictory, or ambiguous due to legacy verbiage that carries over from contract to contract.

There are attempts to counter these deficiencies. One such attempt is by producing smart contracts that may be machine readable. These contracts may use technologies such the Industrial Internet of Things (IIoT) and Distributed Ledger Technology (DLT), aka blockchains, to capture, verify, validate, and enforce agreed-upon terms between multiple parties. A smart contract takes real-world, legally governed events and collects IIoT data for performance measurements including information from sensors, meters, and other business processes. This data then informs the automated terms of a contract by posting results and accompanying proof to the blocks.

Such smart contracts are typically software programs that automate the execution of contract terms. However, the computable part applies only to the performance of the executable terms of the contract. Smart contracts do not replace natural language contracts but instead function as a computer program that connects to a natural language contract through an addendum that attempts to establish an inviolable link between the program and a natural language contract. The result tends to be that rather than simplifying the problem, two sets of professionals are now needed. Lawyers to draft and understand the natural language contract, and computer software engineers to draft and verify the software portion of the contract.

What is needed instead is an expressive, computationally efficient, easily auditable contractual language. Such a language should be as close to a natural language as possible while expressing necessary legal contract requirements in the clearest possible manner. It should also be capable of automatic conversion into machine readable form for automated verification, analysis, and querying. Such a language may, for instance, facilitate someone who is neither a lawyer or a software engineer to author a legal contract that is both legally and computationally sound and efficient.

The relevant prior art includes: U.S. Pat. No. 9,218,339 issued to Zechner, et al. on Dec. 22, 2015, entitled "Computer-implemented systems and methods for content scoring of spoken responses" that describes systems and methods for scoring a non-scripted speech sample. A system includes one or more data processors and one or more computer-readable mediums. The computer-readable mediums are encoded with a non-scripted speech sample data structure, where the non-scripted speech sample data structure includes: a speech sample identifier that identifies a non-scripted speech sample, a content feature extracted from the non-scripted speech sample, and a content-based speech score for the non-scripted speech sample. The computer-readable mediums further include instructions for commanding the one or more data processors to extract the content feature from a set of words automatically recognized in the non-scripted speech sample and to score the non-scripted speech sample by providing the extracted content feature to a scoring model to generate the content-based speech score.

U.S. Pat. No. 9,471,667 issued to Yamamoto, et al. on Oct. 18, 2016, entitled "Systems and methods for evaluating multilingual text sequences" that describes systems and methods for scoring a response to a character-by-character highlighting task. A similarity value for the response is calculated by comparing the response to one or more correct responses to the task to determine the similarity or dissimilarity of the response to the one or more correct responses to the task. A threshold similarity value is calculated for the task, where the threshold similarity value is indicative of an amount of similarity or dissimilarity to the one or more correct responses required for the response to be scored at a certain level. The similarity value for the response is compared to the threshold similarity value. A score is assigned at, above, or below the certain level based on the comparison.

McAllester, D. and Givan, R. (1992). Natural language syntax and first-order
inference, Artificial Intelligence 56: 1-20, that defines a syntax for first order logic based on the structure of natural language, and which is hereby incorporated by reference in its entirety.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

Inventive systems and methods of creating and using a transparent, computable contractual natural language are disclosed. The language may be considered transparent in that each sentence written in it may have one, and only one, interpretation. The language may be computable in that it may be automatically translated into a language that may be interpreted and operated on by a suitably programmed computer.

In one preferred embodiment, a set of legal contracts may be text mined using a text mining software module that may be operable on a digital data processing system. The result of the text mining may be a structured contractual database. An assembling software module may then obtain a set of categorized contractual phrases from the structured contractual database.

A transparent knowledge representation language may be defined using a set of syntax rules, and a set of semantic rules, as described in detail below. The transparent, computable contractual natural language may then be the set of contractual phrases that map to the transparent knowledge representation language. This set may, for instance, be determined using software modules such as, but not limited to, natural language processors that may include modules such as, but not limited to, a semantic parser and an inclusion-checker.

Once the transparent, computable contractual natural language has been partially or fully obtained, a user may then write a computable legal contract that may be comprised of phrases or sentences contained in the transparent, computable contractual natural language.

As discussed in more detail below, text mining the legal documents may require providing categories to be sought. For instance, a lease agreement may contain categories such as, but not limited to, "rent", "renewal", "deposit", and "parking". Each of these categories may in turn have sub-categories. For instance, the category "parking" may have subcategories such as, but not limited to, "number (of spaces)" and "cost".

The text mining software may be trained on a training subset of the legal documents to obtain representative patterns and associated aggregation rules that may link the representative patterns to the categories and subcategories selected. The training may, for instance, be accomplished, in part, using either statistical or symbolic machine learning techniques such as, but not limited to, annotation, clustering, natural language processing, and support vector classification, as described in more detail below.

These representative patterns and the associated aggregation rules may then be used to analyze legal contracts that were not part of the training subset to obtain lists that may take the form of a 3-tuples. The 3-tuples may, for instance, contain a category label and value, an identifier indicative of a location in one of the legal contracts corresponding to the category, and an evidentiary text associated with the category. This list of 3-tuples may be a structured contractual database.

A set of categorized contractual phrases may then be obtained from the structured contractual database. This process is described in detail below, but may, for instance, involve performing a series of actions that may include, but are not limited to the following steps. For each category in the structured contractual database, a set of associated sub-categories may be obtained. Then a set of aggregation rules may be used to obtain evidentiary texts associated with the category and each of any subcategories. These evidentiary texts may then be assembled to obtain contractual phrases for the category and any subcategories it may have.

In a further embodiment of the present invention, the digital data processing system may be linked to a suitably programmed digital computer having a user interface. A user may then interact with one or more structured menus of the interface to select desired phrases from the computable, contractual natural language, in order to create a document such as, but not limited to, a computable legal contract.

The user may also use the interface to provide a legal contract and a query that may involve one or more required categories and/or subcategories, and use the system to analyze the legal contract and obtain a contract specific list of one or more 3-tuples, that may include an evidentiary text associated with a location of one or more of the required categories or subcategories. The system may additionally highlight and flag one or more of the locations in the legal contract corresponding to the category or subcategory, and return the marked up legal contract to the user.

In the instance when the query is a "Yes/No" question, analyzing the legal contract may begin by converting the "Yes/No" question to a statement containing an unknown. A specific category or subcategory relevant to the "Yes/No" question may then be obtained from the statement. If, or when, the contract specific list of 3-tuples contains an occurrence of the specific category or subcategory relevant to question, the system may output a confirmation of the "Yes/No" question.

In the instance when the query is one of a "When", "Which", "What", "Who", or "Whom" question, analyzing the legal contract may begin by converting the query into a specific category or subcategory relevant the question. If, or when, the contract specific list of 3-tuples contains an occurrence of the specific category or subcategory, a value associated with the category or subcategory may be returned, or output, as a response to the query.

In a further embodiment of the present invention, the digital data processing system may also include a reasoning engine that may have a set of inference rules. The reasoning engine may be programmed such that it may take as an input one or more phrases or sentences written in the computable contractual natural language and output, or return, one or more inferences. The reasoning engine may also or instead be provided with a particular set of phrases and a possible inference and automatically determine whether or not the possible inference follows from that particular set of phrases.

Therefore, the present invention succeeds in conferring the following, and others not mentioned, desirable and useful benefits and objectives.

It is an object of the present invention to provide a language that aids in making real-life legal contracts more transparent, i.e., in the sense that each contract phrase or sentence may have one and only one meaning.

It is a further object of the present invention to provide an expressive, computationally efficient, easily auditable contractual language.

It is another object of the present invention to reduce the need for trained professionals in producing and interpreting legal contracts.

Yet another object of the present invention is to provide a system and method of analyzing legal contracts to highlight potential risks, and facilitate decision making.

BRIEF DESCRIPTION OF THE SEVERAL VIEWS OF THE DRAWINGS

FIG. 9 shows a table of a representative syntax of a transparent knowledge representation language of the present invention.

FIG. 10 shows a table of representative semantic evaluation functions of a transparent knowledge representation language of the present invention.

FIG. 11 shows a table summarizing a representative mapping of categorized contractual phrases to a transparent knowledge representation language of the present invention.

FIG. 12 shows a table summarizing representative inference rules for a transparent knowledge representation language of the present invention.

DETAILED DESCRIPTION OF THE INVENTION

Figure 1:
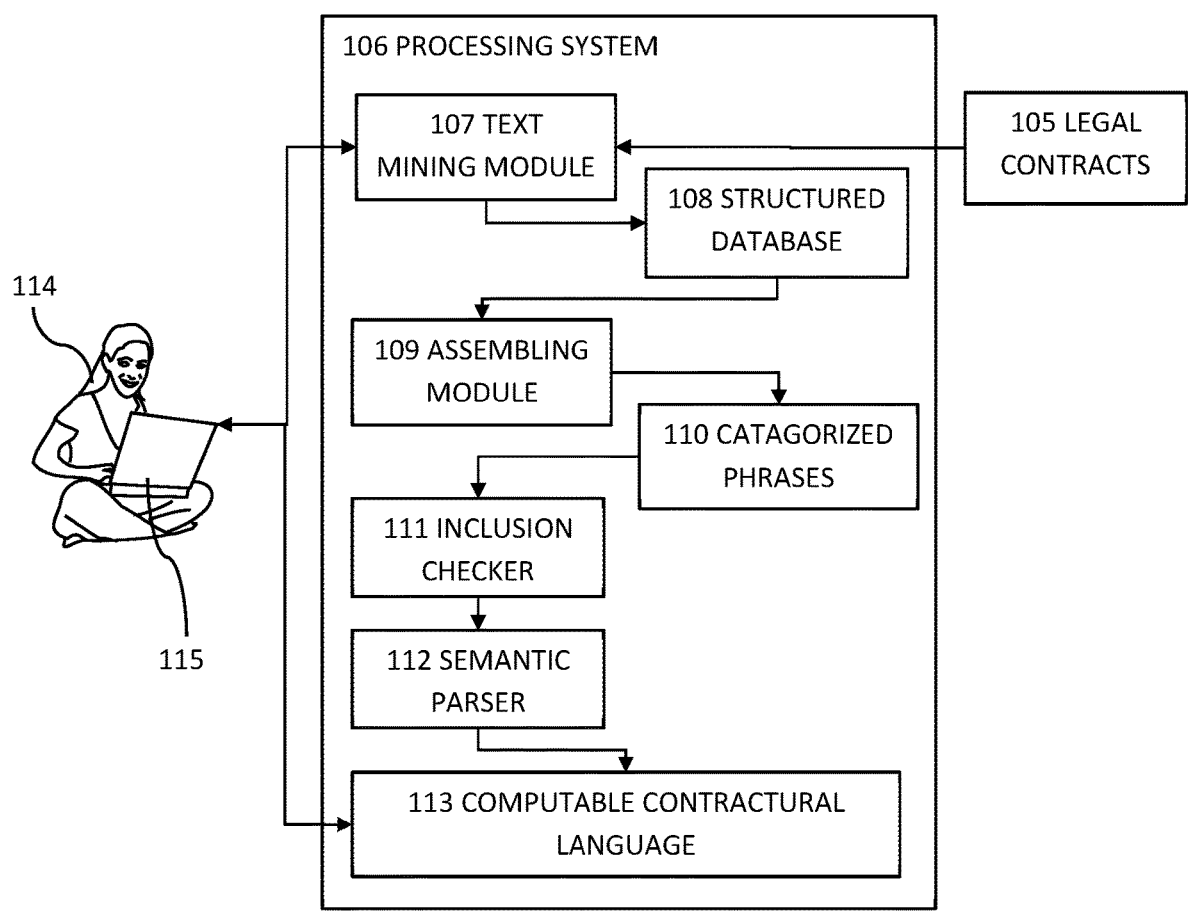
FIG. 1 shows a schematic representation of system for creating and using a transparent, computable contractual natural language.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic representation 101 of a system for creating and using a transparent, computable contractual natural language.

The transparent, computable contractual natural language may be considered transparent in that each sentence in it may have one and only one interpretation. The language may be computable in that it may be automatically translated into a language that may be interpreted by and operated on using a suitably programmed computer.

As shown, a set of legal contracts 105 may be procured for text mining. These legal contracts 105 may, for instance, be obtained from the practiced contract data space that may be a combination of available contracts and relevant documents as well as general legal world knowledge. These legal documents that are typically unstructured text data may be submitted to a text mining software module 107 for the purpose of obtaining a structured contractual database 108. The process of the text mining may involve first training a suitably programmed text mining module 107 to learn or obtain representative patterns and the aggregation rules that may link them to legally relevant categories and subcategories.

The text mining software module 107 may be operable on a digital data processing system 106 that may be any suitably powerful digital computer, such as, but not limited to, an NVIDIA TITAN RTX workstation as supplied by the NVIDIA Corporation headquartered in Santa Clara, Calif.

The representative patterns and the aggregation rules obtained by text mining may then be used to analyze a further set of legal contracts to obtain the structured contractual database that may take the form of a list of 3-tuples. Each of the 3-tuples in the contractual database may contain a category, or subcategory, label and value; an identifier indicative of a location in one of the legal contracts corresponding to the category or subcategory; and an evidentiary text associated with the location and the category or subcategory, as described in more detail below.

An assembling software module 109, that may be operable on the same digital data processing system 106, may then be used in a quasi-reverse process of obtaining a set of categorized contractual phrases 110. This may, for instance, involve using the set of aggregation rules that may have been learnt in constructing the structured contractual database 108. These aggregation rules may, for instance, be used to obtain evidentiary texts associated with various legally relevant categories and any subcategories. These evidentiary texts may then be assembled to obtain contractual phrases and/or sentences for a category and for any subcategories it may have.

A transparent knowledge representation language may be defined using a set of syntax rules, and a set of semantic rules, as described in detail below. The language may be transparent in that it resembles a natural language to the extent that it may be easily understood by someone who can read the relevant natural language. The transparent, computable contractual natural language 113 may then be the set of contractual phrases that map to the transparent knowledge representation language. This set may, for instance, be determined using software modules that may be operable on a natural language processor such as, but not limited to, an inclusion-checker 111 and a semantic parser 112.

The inclusion-checker 111 may, for instance, be programmed to minimize redundancy and to check that the transparent, computable contractual natural language 113 conforms to the required syntax.

The semantic parser 112 may, for instance, be programmed to test the mapping of the categorized contractual phrases and/or sentences 110 into the transparent knowledge representation language.

A user 114 may interact with the digital data processing system 106 to produce a document such as, but not limited to, a computable legal contract 115, or legal contract template, using the transparent, computable contractual natural language 113.

A simple example of a document in the transparent knowledge representation language of the present invention may read as follows:

(John-S.-Smith tenant).
(Roswitha-Stein landlord).
(New-York-Law (governs (this agreement))).
(New-York-courts jurisdiction).
not((tenant (shall-modify(equipment)) (without permission))).
IF (tenant (modify(equipment)) (without permission)) THEN (tenant pay(some penalty)).
(every indemnified party may-retain(separate lawyer)).
(any rent-transfer prohibited) and (agreement (terminates (9 Feb. 2023))).

(each party agrees (the following)).

The transparent, computable, contractual natural language version of this exemplary document may read as follows:

John S. Smith is the tenant. Roswitha Stein is the landlord. New York law is the governing law. This agreement is governed by New York law. New York courts are the jurisdiction. A tenant shall not modify equipment without permission. If a tenant modifies equipment without permission, then a tenant pays some penalty. Every indemnified party may retain a separate lawyer. Any rent transfer is prohibited, and the agreement terminates on 9 Feb. 2023. Each part agrees to the following.

The language may be considered transparent in that each sentence or phrase may have one and only one meaning or interpretation.

Figure 2:
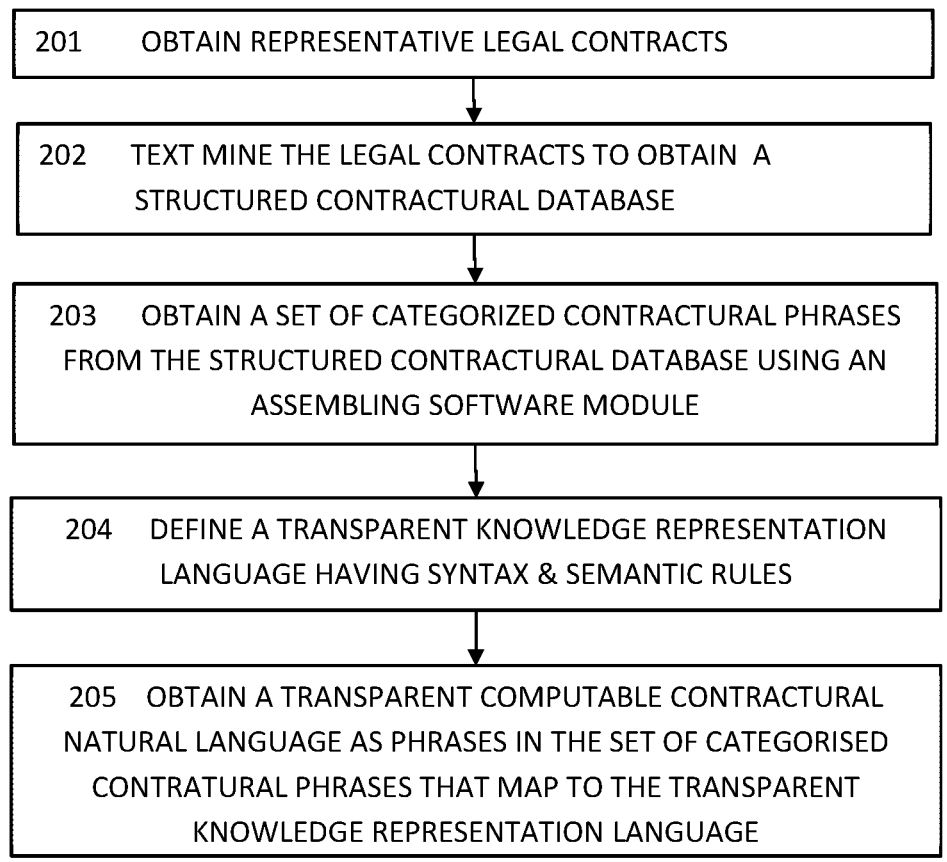
FIG. 2 is a flow diagram showing representative steps in obtaining a transparent, computable contractual natural language.

FIG. 2 is a flow diagram 200 showing representative steps in obtaining a transparent, computable contractual natural language.

In Step 201 "OBTAIN REPRESENTATIVE LEGAL CONTRACTS" a set of representative legal contracts may be obtained from the practiced contract data space. This practiced contract data space may be a combination of available contracts and relevant documents as well as general legal world knowledge. The contracts may, for instance, cover various legal contract domains such as, but not limited to, leasing agreements, professional services agreements, licensing agreements, real estate agreements, and employment agreements, or some combination thereof.

In Step 202 "TEXT MINE THE LEGAL CONTRACTS TO OBTAIN A STRUCTURED CONTRACTURAL DATABASE" a text mining software module may first be trained on a training subset of the legal documents to obtain representative patterns and associated aggregation rules for a range of categories and subcategories present in the legal contracts. The training may, for instance, be accomplished, in part, using statistical or symbolic machine learning techniques such as, but not limited to, annotation, clustering, natural language processing, and support vector classification.

These representative patterns and the associated aggregation rules may then be used to analyze legal contracts that were not part of the training subset to obtain lists that may take the form of 3-tuples. The 3-tuples may, for instance, contain a category label and value, an identifier indicative of a location in one of the legal contracts corresponding to the category, and an evidentiary text associated with the category. This list of 3-tuples may be a structured contractual database.

In Step 203 "OBTAIN A SET OF CATEGORIZED CONTRACTURAL PHRASES FROM THE STRUCTURED CONTRACTURAL DATABASE USING AN ASSEMBLING SOFTWARE MODULE" a set of categorized contractual phrases may be obtained from the structured contractual database. This process may involve performing a series of actions that may include, but are not limited to the following steps. For each category in the structured contractual database, a set of associated sub-categories may be obtained. A set of aggregation rules may then be used to obtain evidentiary texts associated with the category and each of any subcategories. These evidentiary texts may then be assembled to obtain contractual phrases for the category and any subcategories it may have.

In Step 204 "DEFINE A TRANSPARENT KNOWLEDGE REPRESENTATION LANGUAGE HAVING SYNTAX & SEMANTIC RULES", the syntax rules, i.e., the arrangement of words, symbols and phrases that create well-formed sentences, and the semantic rules, i.e., the meaning of the words, symbols, and phrases, may be defined. The meaning of a phrase of sentence may, for instance, be a condition of its truth value.

The syntax of the transparent knowledge representation language of the present invention may, for instance, have the following arrangement for well-formed sentences involving class expressions s and w:

(every s w): meaning every s is a w
(some s w): meaning some s's are w
(at-most-one s): only one or zero s exists
(some s exists): some s exists The class expressions s and w may, for instance, consist of constants c, predicate symbols, binary relations R, inverse binary relations $R^{-1}$, 3-ary relations $R_3$ and variables x.

Examples may, for instance, be:
A constant: c John-Smith
A predicate symbol: Tenant
(R(some s)) (enforce(some change))
(R(every s)) (impound(every vehicle))

A more comprehensive exposition of a possible syntax of a transparent knowledge representation language of the present invention is shown in Table 1 of FIG. 9.

The semantic meaning of a phrase of sentence may, for instance, be a condition of its truth value. Table 2 in FIG. 10 shows representative semantic evaluation functions of a possible transparent knowledge representation language of the present invention.

In Step 205 "OBTAIN A TRANSPARENT COMPUTABLE CONTRACTURAL NATURAL LANGUAGE AS PHRASES IN THE SET OF CATEGORISED CONTRATURAL PHRASES THAT MAP TO THE TRANSPARENT KNOWLEDGE REPRESENTATION LANGUAGE" the transparent, computable contractual natural language may then be the set of contractual phrases that map to the transparent knowledge representation language, i.e., the set of phrases that may be represented using the syntax and semantic rules that may define the transparent knowledge representation language. This set may, for instance, be determined automatically using software modules such as, but not limited to, a semantic parser and an inclusion-checker that may, for instance, be a part of a natural language processor.

Figure 3:
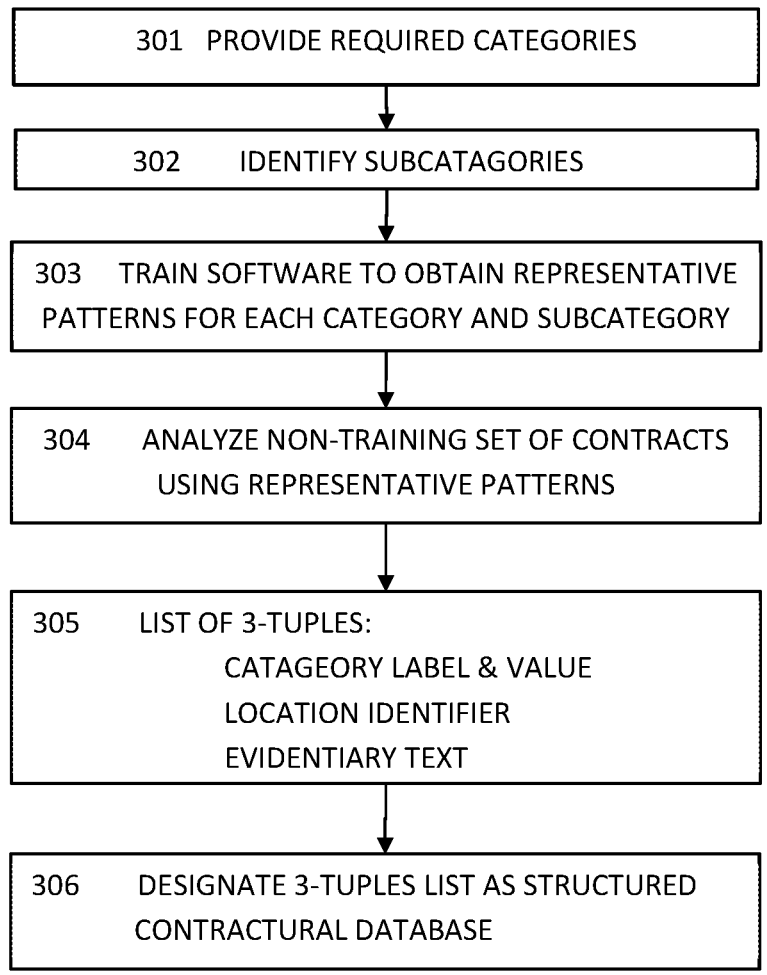
FIG. 3 is a flow diagram showing representative steps of text mining legal contracts to obtain a structured contractual database.

FIG. 3 is a flow diagram 300 showing representative steps of text mining representative legal contracts to obtain a structured contractual database.

In Step 301 "PROVIDE REQUIRED CATEGORIES" the text mining software module may need to be provided with the legal categories on which it is to be trained for text mining. These categories may depend on the legal domains being trained. For instance, a lease agreement may contain categories such as, but not limited to, "rent", "renewal", "deposit", and "parking". These categories may need to be provided by the user, or may be obtained from a preprepared table of categories applicable to the domain or domains being trained, or some combination thereof.

In Step 302 "IDENTIFY SUBCATAGORIES" each of the categories being trained for may in turn have subcategories. For instance, the category "parking" in a leasing contract may have subcategories such as, but not limited to, "number (of spaces)" and "cost". These subcategories may need to be provided by the user, or may be obtained from a preprepared table of subcategories applicable to the categories being trained for, or some combination thereof.

Not all categories may have categories, resulting in zero subcategories for some categories.

In Step 303 "TRAIN SOFTWARE TO OBTAIN REPRESENTATIVE PATTERNS FOR EACH CATEGORY

AND SUBCATEGORY" the text mining software module may be trained on a training subset of legal contracts to obtain representative patterns and associated aggregation rules for each category. This training may include subtasks such as, but not limited to, annotation, clustering, and natural language processing. These subtasks may, for instance, be implemented manually or by machine learning algorithms, or some combination thereof.

The result may be representative patterns that, for instance, are a formal representation of the most distinguishable linguistic features pertinent to the category or subcategory.

For instance, in a lease contract, text mining for the category of "parking", subcategory "number of spaces", the phrase:

"Tenant shall be entitled to five vehicle parking spaces" may be annotated as being pertinent.

This may then be converted to a representative pattern such as, but not limited to:

"Noun Phrase [head=tenant or alternative(tenant)], Verb Phrase [head=entitle or alternative (entitle), voice=passive], to, X, Noun Phrase[head=space or alternative(space), optional(modifier containing the lexicon parking or alternative(parking)]".

The aggregation rules may link one or more of such representative patterns to one or more categories or subcategories.

In Step 304 "ANALYZE NON-TRAINING SET OF CONTRACTS USING REPRESENTATIVE PATTERNS" the representative patterns and associated aggregation rules obtained by text mining may then be used to analyze a further set of legal contracts to obtain the structured contractual database that may take the form of a list of 3-tuples.

In Step 305 "LIST OF 3-TUPLES: CATEGORY LABEL & VALUE; LOCATION IDENTIFIER; EVIDENTIARY TEXT" the structured contractual database may, for instance, be obtained as a list of 3-tuples. Each of these may contain a category label and value; an identifier indicative of a location in one of the legal contracts corresponding to the category; and an evidentiary text associated with the location and the category. The 3-tuples may each also contain a subcategory label and value; an identifier indicative of a location in one of the legal contracts corresponding to the subcategory; and an evidentiary text associated with the location and the subcategory.

In Step 306 "DESIGNATE 3-TUPLES LIST AS STRUCTURED CONTRACTUAL DATABASE" the 3-tuple list obtained in the previous step may be designated as being the structured contractual database that may be the required output of the text mining process.

Figure 4:
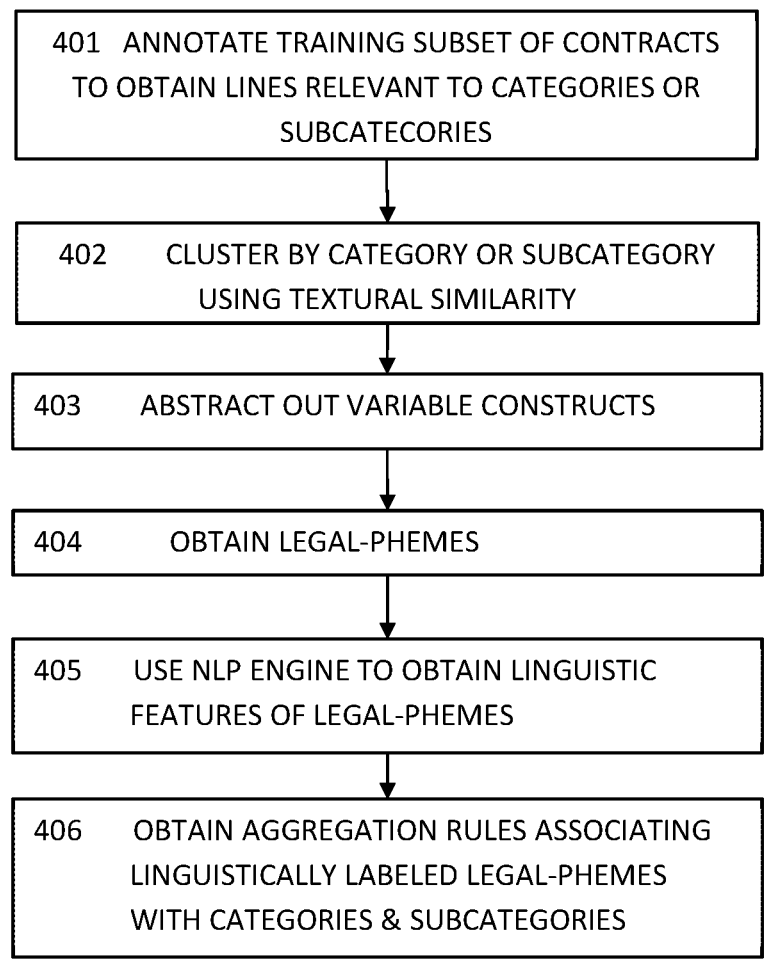
FIG. 4 is a flow diagram showing representative steps of training text mining software to obtain representative patterns for categories and subcategories in legal contracts.

FIG. 4 is a flow diagram 400 showing representative steps of training text mining software to obtain representative patterns for categories and subcategories.

Obtaining representative patterns indicative of particular categories and subcategories may be considered a subtask, or first part, of the overall text mining of legal contracts to obtain a structured contractual database.

In Step 401 "ANNOTATE TRAINING SUBSET OF CONTRACTS TO OBTAIN LINES RELEVANT TO CATEGORIES OR SUBCATECORIES" a training subset of the legal contracts may be marked up, or annotated, to obtain lines that may be relevant to the categories and/or subcategories selected for training. The annotation may be performed by skilled legal professionals, by unskilled workers following a rubric, by machine learning algorithms, or some combination thereof. A relevant line may, for instance, be the text between two computer readable end-of-line symbols, a line of formatted text, a sentence defined as starting with a capitalized word and ending with a semi-colon or a period, or some combination thereof, that contains a text fragment relevant to the category or subcategory for which the text mining software is being trained.

In Step 402 "CLUSTER BY CATEGORY OR SUBCATEGORY USING TEXTURAL SIMILARITY" the relevant lines obtained it the previous step may be grouped, or clustered. This clustering may, for instance, be by category or subcategory using textural similarity. Clustering by textural similarity may, for instance, involve aligning similar windows of text.

In Step 403 "ABSTRACT OUT VARIABLE CONSTRUCTS" the relevant lines may be examined to abstract out variable constructs, i.e., examined to find key information or data points of interest or relevance. These abstractions may be mathematical constructs such as, but not limited to, dates and monetary amounts. Other variable constructs that may abstracted out include names, such as, but not limited to, company and personal names. These may, for instance, be stored as a name value pair, i.e., "Wonderful Company, Inc.": "company", "John Smith": "name".

In Step 404 "OBTAIN LEGAL-PHEMES". In analogy to graphemes being the smallest meaningful contrastive unit in a writing system, a legal-pheme may be defined as a compact text fragment having a legally relevant association to one of the categories or subcategories being text mined.

In Step "USE NLP ENGINE TO OBTAIN LINGUISTIC FEATURES OF LEGAL-PHEMES", having obtained legal-phemes in the relevant lines, the legal-phemes may be examined by a natural language engine to obtain their relevant linguistic features. Natural language processors typically operate using machine-learning and may use symbolic or statistical algorithms. Tasks performed by natural language processors include, but are not limited to tokenization, lemmatization, stemming, parsing, and part-of speech tagging.

For instance, in a legal line" "Landlord shall have the right to enforce parking charges (by operation of meters or otherwise);", a legal-pheme may be "landlord have the right to enforce parking charges". This may then be processed by the natural language processor to obtain relevant linguistic features of the legal-pheme and produce the linguistically labeled legal-pheme: "Noun Phrase [head=landlord or alternative(landlord)], Verb Phrase [head=enforce or alternative (enforce), voice=active], Noun Phrase[head=charge or alternative(charge), optional(modifier containing the lexicon parking or alternative(parking))]".

This linguistically labeled legal-pheme may, for instance, be associated with the category "parking" and subcategory "cost". This linguistically labeled legal-pheme may also be considered to be a representative pattern.

In Step 406 "OBTAIN AGGREGATION RULES ASSOCIATING LINGUISTICALLY LABELED LEGAL-PHEMES WITH CATEGORIES & SUBCATEGORIES" the text mining module may learn aggregation rules. An aggregation rule may, for instance, be a Boolean rule associating one or more linguistically labeled legal-phemes with one or more categories or subcategories.

For instance, the lines: "Parking areas shall be used only for parking vehicles. Washing, waxing, cleaning or servicing of vehicles, or the storage of vehicles for longer than 48-hours, is prohibited unless otherwise authorized by Landlord", may produce three separate, linguistically labeled legal-phemes:

Legal-pheme A: Encapsulates "Parking areas on for parking vehicles"

Legal-pheme B: Encapsulates "Cleaning or servicing prohibited"

Legal-pheme C: Encapsulates "Storage for longer than 48 hours prohibited"

A simple aggregation rule may then be:

If any of A, B or C then "parking".

In this way categories or subcategories may be associated with linguistically labeled legal-phemes via the aggregation rules.

Figure 5:
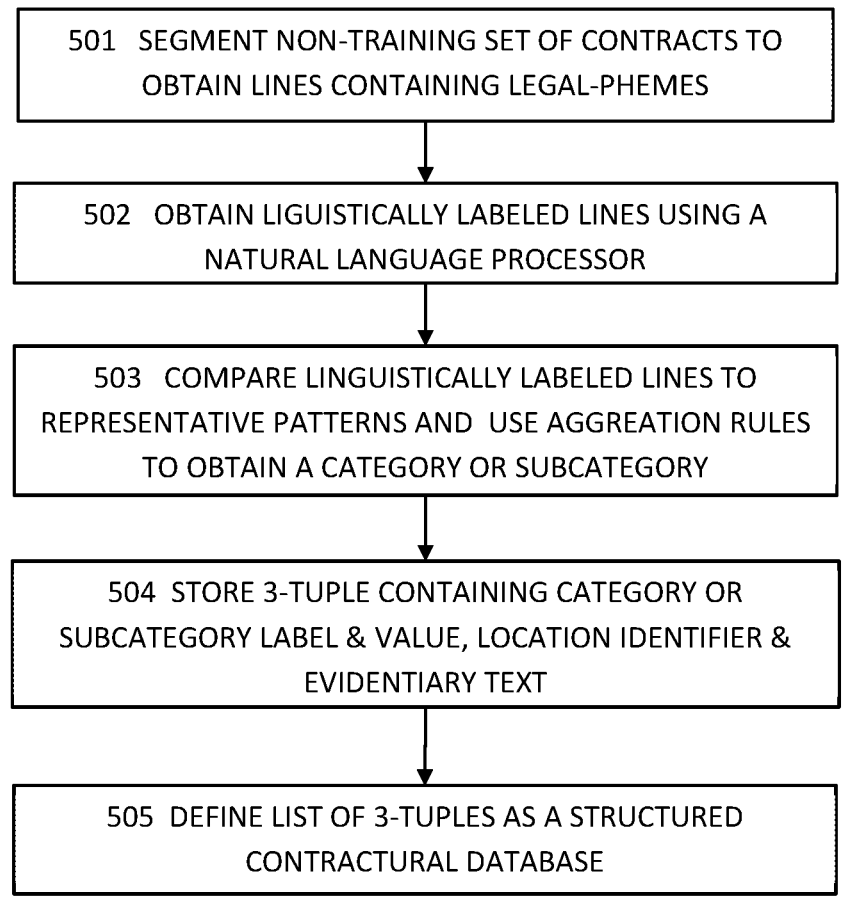
FIG. 5 is a flow diagram showing representative steps of analyzing legal contracts to obtain a structured contractual database.

FIG. 5 is a flow diagram 500 showing representative steps of analyzing legal contracts to obtain a structured contractual database.

Analyzing the non-training set of legal contracts to obtain a structured contractual database may be another subtask of text mining the representative legal contracts.

In Step 501 "SEGMENT NON-TRAINING SET OF CONTRACTS TO OBTAIN LINES CONTAINING LEGAL-PHEMES" a set of legal contracts that preferably does not contain contracts used to train the text mining software module may be segmented to obtain lines containing legal-phemes.

In Step 502 "OBTAIN LINGUISTICALLY LABELED LINES USING A NATURAL LANGUAGE PROCESSOR", a natural language processor may convert the lines obtained in the previous step into linguistically labeled lines.

In Step 503 "COMPARE LINGUISTICALLY LABELED LINES TO REPRESENTATIVE PATTERNS AND USE AGGREGATION RULES TO OBTAIN A CATEGORY OR SUBCATEGORY" the linguistically labeled lines obtained in the previous step may be compared to the learned representative patterns, and the learned aggregation rules may then be used in order to obtain a relevant category or subcategory.

In Step 504 "STORE 3-TUPLE CONTAINING CATEGORY OR SUBCATEGORY LABEL & VALUE, LOCATION IDENTIFIER & EVIDENTIARY TEXT", having obtained the relevant category or subcategory, a 3-tuple may now be created and stored. The 3-tuple may contain a label and value of the category or subcategory, along with a location identifier and evidentiary text. The location identifier may, for instance, identify the legal contract in which the legal-phemes were located as well as the line number within that document it occurred. The evidentiary text may be a legal-pheme itself, or a set of legal-phemes.

In Step 505 "DEFINE LIST OF 3-TUPLES AS A STRUCTURED CONTRACTURAL DATABASE" a list of 3-tuples obtained by the preceding steps may now be defined as, or designated as, the structured contractual database. This list may, for instance, be combined with a similar list of 3-tuples obtained during training the text mining software.

Figure 6:
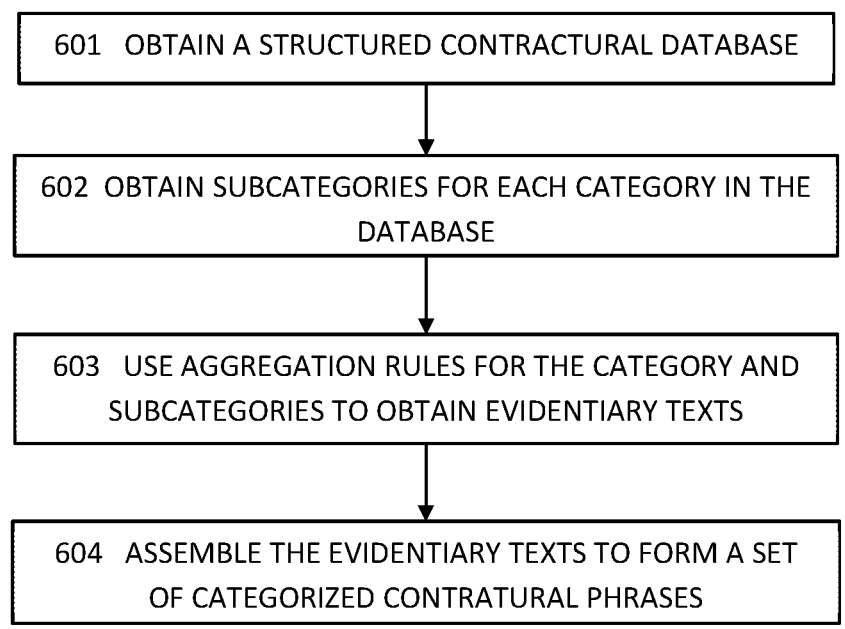
FIG. 6 is a flow diagram showing representative steps in obtaining a set of categorized contractual phrases from a structured contractual database.

FIG. 6 is a flow diagram 600 showing representative steps in obtaining a set of categorized contractual phrases from a structured contractual database.

Obtaining a set of contractual phrases from a structured contractual database may be considered as the quasi-reverse operation of obtaining a structured contractual database from a set of representative legal contracts. A difference may, however, be that the set of contractual phrases may be a cleaner, more uniform, and more relevant set of phrases representative of the categories and subcategories in the various legal domains, and may, therefore, be used to create cleaner, more uniform, and more relevant legal contracts and/or templates.

In Step 601 "OBTAIN A STRUCTURED CONTRACTURAL DATABASE" a structured contractual database may be obtained by, for instance, using the methods outlined above. The structured contractual database may consist of a list of 3-tuples, each of which may contain a label and value of a category, along with a location identifier and evidentiary text relevant to that category.

In Step 602 "OBTAIN SUBCATEGORIES FOR EACH CATEGORY IN THE DATABASE" the subcategories for each of the categories in the database may be obtained. Each of the subcategories may be represented by one or more 3-tuples, each of which may contain a label and value of the subcategory, along with a location identifier and evidentiary text relevant to that subcategory.

In Step 603 "USE AGGREGATION RULES FOR THE CATEGORY AND SUBCATEGORIES TO OBTAIN EVIDENTIARY TEXTS" the aggregation rules obtained during the text mining may be used in reverse to obtain appropriate evidentiary texts representative of the categories and/or subcategories.

In Step 604 "ASSEMBLE THE EVIDENTIARY TEXTS TO FORM A SET OF CATEGORIZED CONTRATURAL PHRASES", an assembling software module may be used to assemble the evidentiary texts obtained in the previous step into a set of categorized contractual phrases and/or sentences that may be representative of the legal categories and/or subcategories contained in the structured contractual database.

Figure 7:
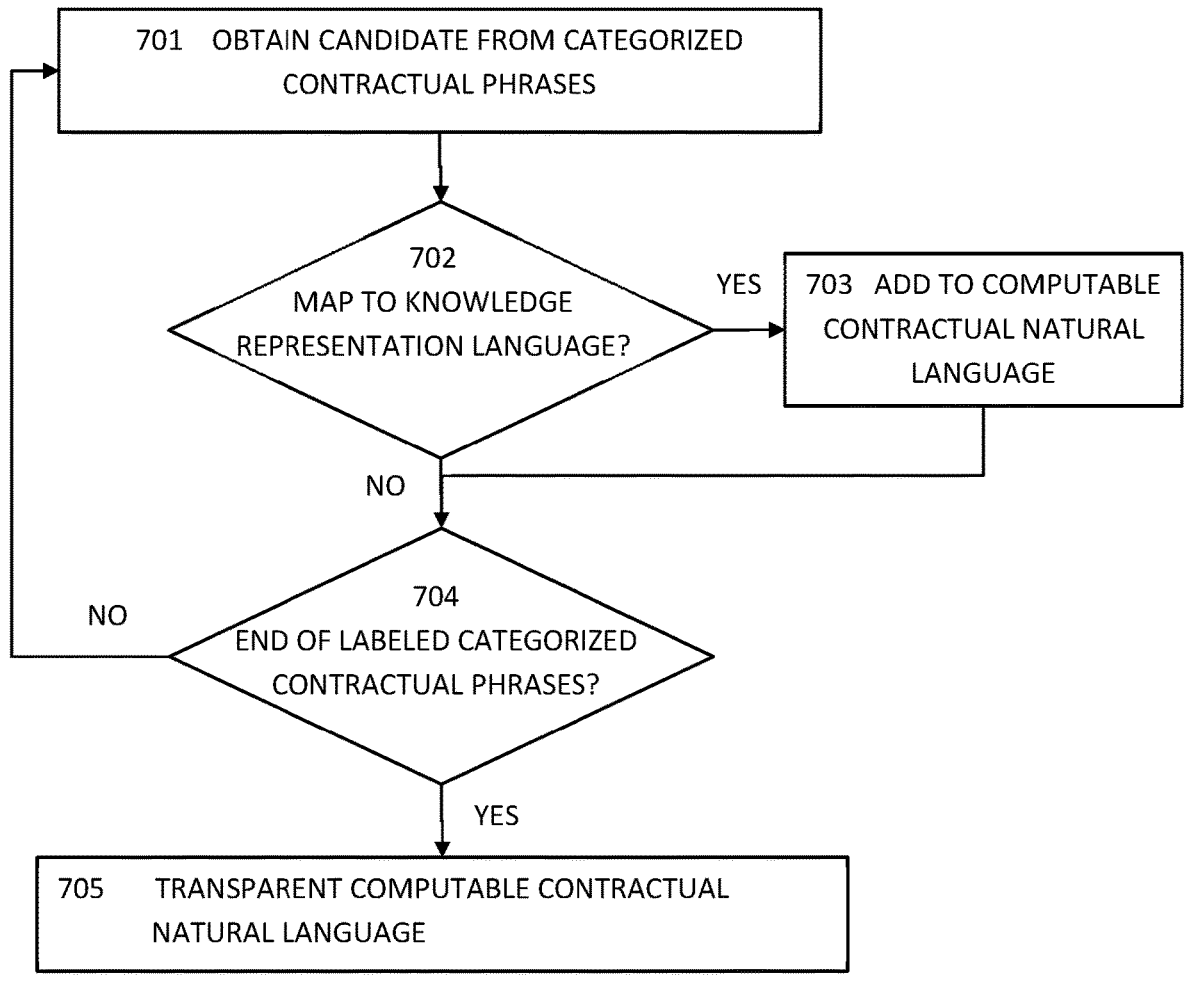
FIG. 7 is a flow diagram showing representative steps of obtaining a transparent, computable contractual natural language by mapping categorized contractual phrases to a transparent knowledge representation language.

FIG. 7 is a flow diagram 700 showing representative steps of obtaining a transparent, computable contractual natural language by mapping phrases from a set of categorized contractual phrases to a transparent knowledge representation language.

In Step 701 "OBTAIN CANDIDATE FROM LABELED CATEGORIZED CONTRACTUAL PHRASES" a contractual phrase representative of a legal category or subcategory may be obtained from a set of categorized contractual phrases.

In Step 702 "MAP TO KNOWLEDGE REPRESENTATION LANGUAGE?" an attempt may be made to map the contractual phrase selected in the previous step into a transparent knowledge representation language such as, but not limited to, to the transparent knowledge representation language of the present invention described above. This attempt at mapping may, for instance, be accomplished using a suitably programmed semantic parser and a suitably programmed inclusion-checker. The inclusion checker and semantic parser may, for instance, be part of a natural language processor.

Table 3 in FIG. 11 shows a summary of representative rules that may, for instance, be used for mapping categorized contractual phrases to a transparent knowledge representation language.

If the mapping is successful, i.e., if the selected phrase may be represented using the syntax and semantic rules of the transparent knowledge representation language, then the process may proceed to step 703.

In Step 703 "ADD TO COMPUTABLE CONTRACTUAL NATURAL LANGUAGE" the successfully mapped contractual phrase may now be added to, and become a part of, the transparent, computable contractual natural language. The process would then proceed to Step 704.

If, however, in Step 702, the selected phrase cannot be successfully mapped to the transparent knowledge representation language, then the phrase may not be added to it, and the process may proceed directly to Step 704.

In Step 704 "END OF LABELED CATEGORIZED CONTRACTUAL PHRASES'?" a check may be made to see if the list of categorized contractual phrases has been exhausted. If it has not been, the process may loop back to Step 701 and repeat at least steps 701 and 702.

If the list of categorized contractual phrases has been exhausted, the process may proceed to Step 705.

In Step 705 "TRANSPARENT COMPUTABLE CONTRACTUAL NATURAL LANGUAGE" all the categorized contractual phrases that mapped to the transparent knowledge representation language may now be considered to be the transparent, computable contractual natural language.

Figure 8:
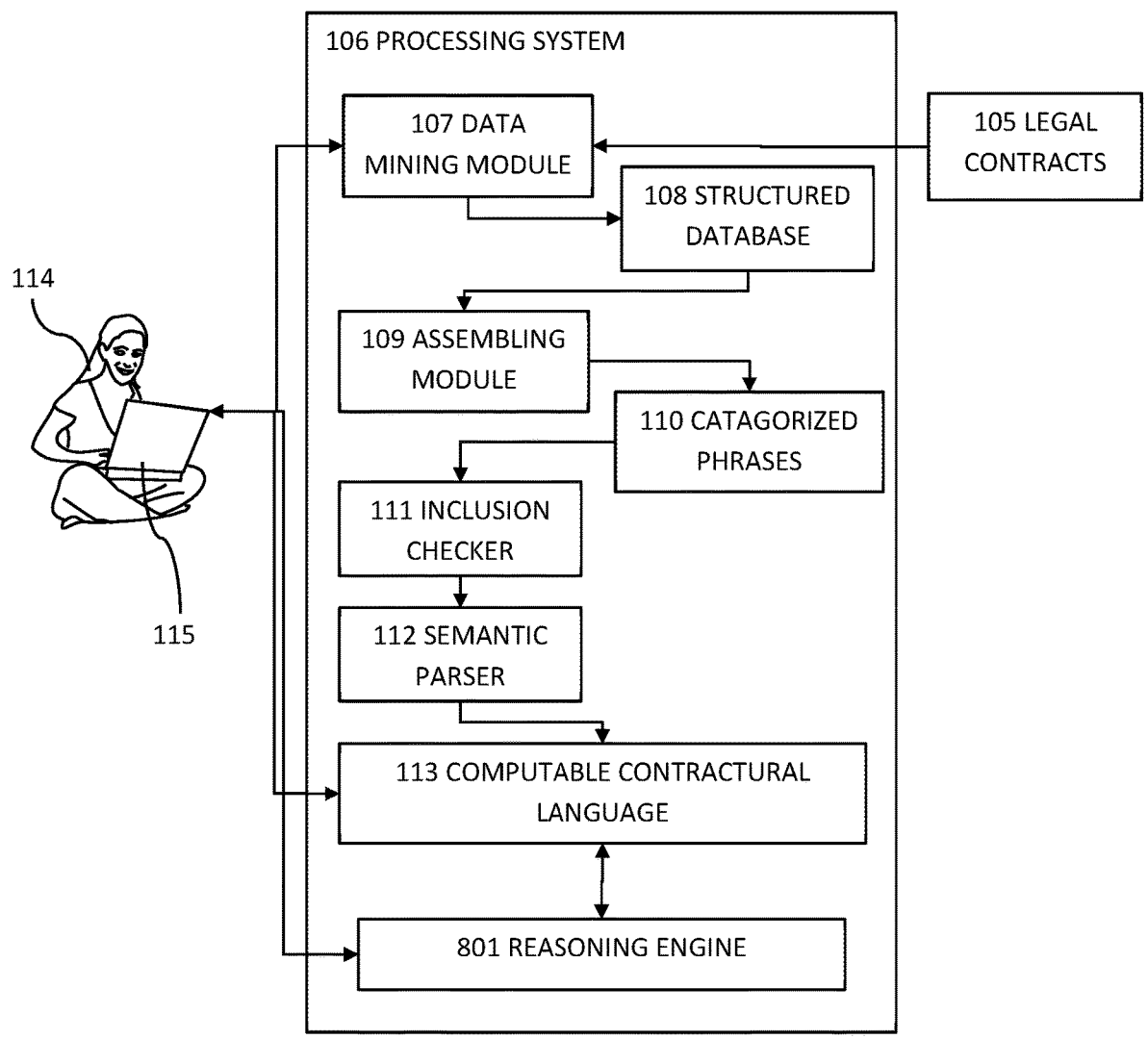
FIG. 8 shows a schematic representation of a further embodiment of a system for creating and using a transparent, computable contractual natural language.

FIG. 8 shows a schematic representation 800 of a further embodiment of a system for creating and using a transparent, computable contractual natural language.

As with the embodiment of FIG. 1, this embodiment may include a digital data processing system 106 on which a number of software modules may be operative such as, but not limited to, a text mining software module 107, an assembling software module 109, an inclusion-checker 111, and semantic parser 112. As with the embodiment of FIG. 1, this embodiment may support databases such as, but not limited to, a structured contractual database 108 and a database of categorized contractual phrases 110, and may receive data in the form of a set of legal contracts 105.

The embodiment of FIG. 8 may also include a reasoning engine 801. The reasoning engine that may have a set of inference rules and may be programmed such that it may take as an input one or more phrases or sentences written in the transparent, computable contractual natural language and may output, or return, one or more inferences.

Table 4 in FIG. 12 shows a summary of representative inference rules that may, for instance, be used in evaluating transparent knowledge representation language expressions.

The reasoning engine may also or instead be programed such that, when provided with a particular set of phrases and a possible inference, it may automatically determine whether or not the possible inference follows from that particular set of phrases.

As shown in both FIGS. 1 and 8, a user 114 may be connected to the digital data processing system 106 via a suitably programmed digital computer having a user interface that may have one or more structured menus. By interacting with the structured menus, the user may, for instance, interact with the transparent, computable contractual natural language 113 to select desired phrases from the transparent, computable contractual natural language in order to create a text document such as, but not limited to, a computable legal contract, or a computable legal contract template.

Furthermore, the user may use the interface to present the digital data processing system 106 with a legal contract, and a query having one or more required categories or subcategories.

The appropriate software modules on the digital data processing system may then analyze legal contract to obtain a contract specific list of one or more 3-tuples, each of said 3-tuples comprising: a category or subcategory label and a value; an identifier indicative of a location in said legal contract corresponding to said category or subcategory label or value; and an evidentiary text associated with said location and said category or subcategory label and value.

Appropriate software modules operable on the digital data processing system may also automatically markup the legal contract by highlighting one or more of the locations in the legal contract corresponding to the category or subcategory associated with the query. The software may also automatically flag the highlighted locations with text or symbols representative of the corresponding category or subcategory that may have been highlighted before returning, or making available, the marked up legal contract to the user.

If the query is a "Yes/No" question, the question may first be converted to a statement, either by the user, or automatically by a suitable natural language processor operable on the digital data processing system. Such a statement may, for instance, contain an unknown. A specific category or subcategory relevant to the "Yes/No" question may then be obtained from the statement, either by the user, or automatically by a suitable natural language processor, or some combination thereof. The appropriate software modules on the digital data processing system may then analyze a legal contract that may be the object of the query to obtain a contract specific list of one or more 3-tuples. If one or more of the 3-tuples contains an occurrence of the specific category or subcategory deemed relevant to the question, the system may then return, or output, a confirmation of the "Yes/No" question.

If the query is one of a "When, Which, What, Who, Whom" question, a specific category or subcategory relevant to the "Yes/No" question may be extracted from the question, either by the user, or automatically by a suitable natural language processor, or some combination thereof. The appropriate software modules on the digital data processing system may then analyze a legal contract that may be the object of the query to obtain a contract specific list of one or more 3-tuples. If or when the contract specific list of 3-tuples contains an occurrence of the specific category or subcategory relevant to the question, the system may return, or output, a value associated with the category or subcategory as a response to the query.

FIG. 9 shows a table of a representative syntax of a transparent knowledge representation language of the present invention.

As shown in Table 1 of FIG. 9, R may be a symbol representing a binary relation. s, t and w may be class expressions, x may be a variable, and $\Phi$ may represent a well-formed formula $R^{-1}$ may represent the inverse of R. $\lambda$ may represent a lambda function.

FIG. 10 shows a table of representative semantic evaluation functions that may be used in a transparent knowledge representation language of the present invention.

FIG. 11 shows a table summarizing a representative mapping of categorized contractual phrases to a transparent knowledge representation language of the present invention.

FIG. 12 shows a table summarizing representative inference rules for a transparent knowledge representation language of the present invention.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of creating and using a transparent, computable contractual natural language, comprising:
   providing a set of legal contracts;
   text mining said legal contracts, using a text mining software module operable on a digital data processing system, to obtain a structured contractual database, wherein, said text mining comprises:
   providing a set of required categories;
   for each category, obtaining a set of zero or more subcategories;
   obtaining representative patterns for each of said categories and subcategories by training said text mining software module using a training subset of said legal contracts;

analyzing one or more of said legal contracts not in said training subset using said representative patterns to obtain a list of one or more 3-tuples, each 3-tuple comprising:
- a category or subcategory label and value;
- an identifier indicative of a location in one of said legal contracts corresponding to said category or subcategory; and,
- an evidentiary text associated with said location and said category or subcategory;

obtaining a set of categorized contractual phrases from said structured contractual database using an assembling software module operable on said digital data processing system;

defining a transparent knowledge representation language having a set of syntax rules, and a set of semantic rules;

automatically determining a set of contractual phrases that map to said transparent knowledge representation language, said set being said transparent, computable contractual natural language; and, writing, by a user, a computable legal contract comprised of phrases contained in said transparent, computable contractual natural language.

2. The method of claim 1, wherein said training said text mining software comprises:
- annotating said training subset of legal contracts to obtain a set of relevant lines associated with one or more of said categories or subcategories;
- clustering said relevant lines by one or more of said categories or subcategories using textural similarity;
- obtaining, in each of said clustered, relevant lines, one or more legal-phemes representative of one or more of said categories or subcategories;
- using a natural language processing engine to obtain one or more linguistic features of said legal-phemes thereby obtaining linguistically labeled legal-phemes or representative patterns; and,
- learning a set of aggregation rules associating said legal-phemes or said linguistically labeled legal-phemes or said representative patterns with one or more of said categories and subcategories.

3. The method of claim 2 wherein, said legal-phemes are text fragments having a legally relevant association to one of said categories or subcategories; and, said aggregation rules comprise Boolean rules associating one or more of said legal-phemes or said linguistically labeled legal-phemes or said representative patterns with one or more of said categories or subcategories.

4. The method of claim 2, claim 1 wherein said analyzing one or more of said legal contracts not in said training subset comprises:
- segmenting said legal contract to obtain relevant lines containing one or more legal-phemes;
- using a natural language processing engine to detect one or more linguistic features of said lines to obtain linguistically labeled lines;
- obtaining representative patterns from said linguistically labeled lines;
- using a set of aggregation rules to obtain a category or subcategory from said representative patterns; and,
- storing, as part of a 3-tuple, a category or subcategory label and value, an identifier indicative of a location in one of said legal contracts corresponding to said category or subcategory, and, an evidentiary text associated with said location.

5. The method of claim 1, wherein, said obtaining a set of categorized contractual phrases from said structured contractual database comprises:
performing, for each category within said contractual database, the steps comprising:
- obtaining a set of sub-categories associated with said category;
- using a set of aggregation rules to obtain evidentiary texts associated with said category and each of said subcategories; and
- assembling said evidentiary texts to obtain said contractual phrases for said category and said subcategories.

6. The method of claim 1, further comprising:
- providing a suitably programmed digital computer having a user interface; and,
- said user interacting with one or more structured menus of said interface to select desired phrases from said transparent, computable contractual natural language, thereby creating said computable legal contract.

7. The method of claim 6, further comprising:
- providing, by said user interacting with said user interface, a legal contract, and a query having one or more required categories or subcategories;
- analyzing said legal contract to obtain a contract specific list of one or more 3-tuples, each of said 3-tuples comprising:
  - a category or subcategory label and a value;
  - an identifier indicative of a location in said legal contract corresponding to said category or subcategory label or value; and,
  - an evidentiary text associated with said location and said category or subcategory label and value.

8. The method of claim 7, further comprising:
- automatically marking up said legal contract by highlighting one or more of said locations in said legal contract corresponding to said category or subcategory;
- automatically flagging said highlighted locations with the corresponding one of said categories or subcategories; and,
- returning said marked up legal contract to said user.

9. The method of claim 7, wherein, said query is a "Yes/No" question, and said analyzing said legal contract further comprises:
- converting said "Yes/No" question into a statement;
- obtaining a specific category or subcategory relevant to said "Yes/No" question from said statement; and,
- when said contract specific list of 3-tuples contains an occurrence of said specific category or subcategory, outputting a confirmation of said "Yes/No" question.

10. The method of claim 7, wherein, said query is one of a "When", "Which", "What", "Who", and "Whom" question, and said analyzing said legal contract further comprises:
- converting the query into a specific category or subcategory relevant the question; and,
- when said contract specific list of 3-tuples contains an occurrence of said specific category or subcategory, outputting said value associated with said category or subcategory as a response to said query.

11. The method of claim 1, further comprising:
- providing a reasoning engine, having a set of inference rules, that takes as input one or more phrases or sentences written in said transparent, computable contractual natural language and outputs one or more inferences.

12. The method of claim 11 wherein, said reasoning engine is provided with a particular set of phrases and a possible inference; and, said reasoning engine automatically determines whether or not said possible inference follows from said particular set of phrases.

\* \* \* \* \*